DUBBING CIRCUITS FOR MAGNETIC RECORDERS WITH MEANS FOR REDUCING FEEDBACK

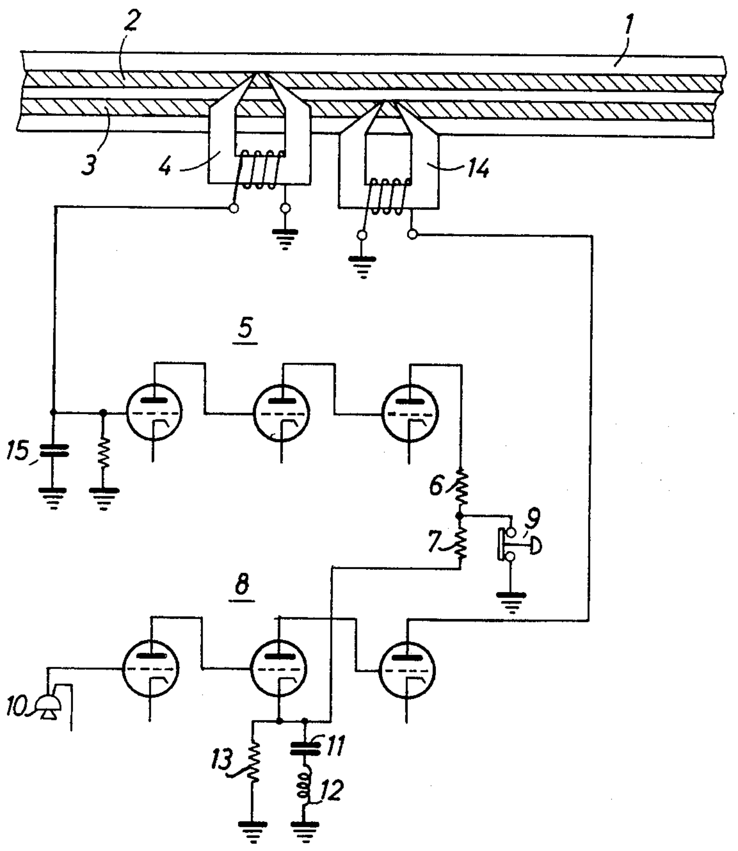
INVENTOR
HELMUT BRANDT
BY Frank R. Jifani
AGENT 3,223,790

Helmut Brandt, Berlin-Grunewald, Germany, assignor to North American Philips Company, Inc., New York, N.Y., a corporation of Delaware Filed Feb. 8, 1962, Ser. No. 171,866
Claims priority, application Germany, Feb. 17, 1961, P 26,695
6 Claims. (Cl. 179—100.2)

The invention relates to a magnetic recorder and/or reproducer with at least two recording-reproducing amplifiers and a dubbing device for transferring the signal recorded on one track onto another track, the first track being scanned with a magnetic head and the scanned amplified signals being supplied to the amplifier associated with the second track. The scanned signals may be mixed with an additional signal to be recorded, if desired.

Such magnetic recorders and/or reproducers are generally known. For example, in one arrangement a tape recorder has been provided with a mixing device to which the signal of one track was supplied. This mixing device is provided with an attenuation circuit and with filters; the second signals to be recorded may be supplied to this mixing device and the two signals mixed in it are supplied to the recording head which records the mixture on the second track of the tape.

Also in a known embodiment, a mixing box separated from the magnetic recorder is employed which is connected in a corresponding manner to the magnetic recorder and the second signal source, for example a microphone.

However, a drawback of such dubbing devices consists in that the two amplifiers present in the magnetic recorder are coupled together by the mixing box so that as a result of the crossed capacitive and inductive couplings of the reproducing and recording heads, the danger of a feedback coupling is great. It has been attempted to mitigate this situation by providing the mixing box with a sufficiently high attenuation and with filters; these additional elements, however, mean an increase in cost.

The invention provides an arrangement for performing such a dubbing from one track to the other with only a slight increase in cost and in an entirely reliable manner. According to one aspect of the invention, the magnetic recorder and/or reproducer is constructed so that the circuit of the scanning magnetic head is completed by a parallel capacitor to a resonant circuit of approximately 7 kc./s. and the amplified signals of the first track are supplied, via a resistor arrangement, to that stage of the amplifier associated with the second track, which stage is provided with a filter for recording, influencing the frequency characteristic of the amplifier.

According to the above aspect of the invention it is only necessary to provide the two amplifiers with a capacitor and to connect them together via a resistor arrangement which, in its simplest form, may be a fixed resistor. Alternatively a controlled resistor may be used; this would make possible a level adjustment of the dubbed information.

For a simple operation, according to a further aspect of the invention, the resistor arrangement may consist of two resistors connected in series, the junction point of the resistors being connected to ground via a switch, a push button or the like in normal rest condition. When the ground connection is opened, the two amplifiers will operate entirely independently of each other, since a signal voltage of one channel cannot reach the other channel.

According to a further aspect of the invention, both amplifiers are provided with the dubbing device acting upon the other amplifier. Dependent on the condition which channel is switched for scanning and which for recording, it is consequently possible in this case to dub from the first to the second channel or from the second channel to the first channel. In this case, to avoid operational errors, it is of advantage to rigidly couple together the two push buttons of the dubbing device.

Such a simple dubbing device may be used because the signal to be dubbed which is given a comparatively high amplitude in an amplifier is not connected to the input of the second amplifier switched for recording but to an intermediate stage of this amplifier, namely that which is provided with the filter for recording. It has appeared that in this manner the filters already present in the magnetic recorder are also sufficient for dubbing, if they are completed by the input parallel circuit which consists of the inductance of the reproducing head and the capacitor connected parallel to it and the grid resistor and attenuation resistor respectively connected parallel thereto and also forms a filter which attenuates the high frequency. The second filter is formed by the filter for recording provided in the second amplifier channel. Both filters are consequently connected in cascade and are entirely sufficient to render such a dubbing possible.

In order that the invention may readily be carried into effect, one embodiment thereof will now be described, by way of example, with reference to the accompanying diagrammatic drawing, the sole figure of which shows a diagrammatic embodiment.

In this embodiment, a tape 1 is provided with the two tracks 2 and 3. It is assumed that a signal is recorded on the track 2 which, together with a second signal, is to be dubbed on the track 3. For scanning the track 2, the reproducing head 4 is used. The signal voltage produced in it is conducted to the input of the first amplifier 5 which, in the embodiment shown, consists of three cascade-connected tubes. The amplifier signal voltage appearing at the anode circuit of the third amplifier tube is tapped and supplied to the cathode of a tube of the second channel amplifier 8 by means of two resistors 6, 7 connected in series. In this case it is assumed that the push-button 9, by means of which the junction of the resistors 6, 7 in the normal or rest condition is grounded, is pressed down so that the connection to ground is removed. The input of the second amplifier 8 is connected to a microphone 10, which microphone the second signal to be recorded is supplied. In the cathode circuit of the second tube of this amplifier there is connected a recording filter which consists of the series arrangement of a capacitor 11 and an inductance 12 as well as a parallel resistor 13. In this tube, the signal derived from the first amplifier 5 and the signal supplied by the microphone 10 are mixed in a readily decoupled manner and both signals are supplied from the output of the last tube of the amplifier 8 to the recording head 14 which coacts with the second track of the tape 1. Thus, the signal scanned by the head 4 is recorded together with the voltage of the microphone 10 as long as the push-button 9 is depressed.

It may be seen from the drawing that in the feedback circuit which leads to the head 14 from the winding of the head 4 via the amplifier 5, the resistors 6, 7 and the two last stages of the amplifier 8, a self-excitation as a result of the stray capacitances and stray inductance which may be active between the two adjacent heads 4 and 14 cannot occur. Particularly critical for the feedback coupling are the higher frequencies of the signal mixture these, however, are considerably attenuated by the first filter consisting of the inductance of the head 4 and the parallel-arranged capacitor 15 and the second filter 11, 12, 13. The value of the resistors 6, 7 is determined by the desired level height of the signal to be recorded.

It may be clear that by an inversely arranged connection with two further resistors corresponding to 6, 7 and a further push-button corresponding to 9, the circuit arrangement may be constructed so that dubbing may be carried out at will from the amplifier 5 to the amplifier 8 or conversely. This operation depends only on which channel and amplifier respectively is used for reproducing and which for recording. However, to avoid operation errors, the two switches may be constructed as contacts of a common push-button.

A particular advantage of the arrangement according to the invention is obtained if the amplifier is constructed, as normal, so that the level adjusting device is connected before the amplifier stage comprising the filter. In this case an independent level adjustment of the signals from the microphone 10 and of the dubbed signal is possible.

While the invention has been described with respect to a specific embodiment, various changes and modifications thereof will be readily apparent to those skilled in the art without departing from the inventive concept, the scope of which is set forth in the appended claims.

What is claimed is:

1. Apparatus for dubbing signals recorded on one track of the tape of a magnetic recorder onto a second track of the same tape, comprising: a reproducing head scanning one track of a magnetic tape, a recording head for recording signals on a second track of the same magnetic tape, first and second signal coils associated with said reproducing and recording heads respectively, a first capacitor connected in parallel with said first signal coil, first amplifier means for amplifying the signals from said first coil, second amplifier means for amplifying the signals applied to said second signal coil, said second amplifier means comprising a plurality of stages one of which includes a tuned filter, and a resistor coupling between the output of said first amplifier means and an input of said one stage of the second amplifier means, said parallel connection in combination with said tuned filter acting to suppress feedback from said reproducing head.

2. Apparatus as claimed in claim 1, wherein said resistor coupling comprises two series-connected resistors, the output of said first amplifier being connected to one end of said series connection, the input of said one stage being connected to the other end of said series connection, the junction of said resistors being selectively connected to ground.

3. Apparatus for dubbing signals recorded on one track of the tape of a magentic recorder and external signals onto a second track of the same tape, comprising: a reproducing head scanning one track of a magnetic tape, a recording head for recording signals on a second track of the same magnetic tape, first and second signal coils associated with said reproducing and recording heads resepctively, a first capacitor connected in parallel with said first signal coil, first amplifier means for amplifying the signals from said first coil, second amplifier means for amplifying the signals applied to said second signal coil, said second amplifier means comprising a plurality of stages one of which includes a tuned filter, a resistor coupling between the output of said first amplifier means and an input of said one stage of the second amplifier means, and means for applying external signals to another input of said one stage, said parallel connection in combination with said tuned filter acting to suppress feedback from said reproducing head.

4. Apparatus as claimed in claim 3, wherein said resistor coupling comprises two series-connected resistors, the output of said first amplifier being connected to one end of said series connection, the input of said one stage being connected to the other end of said series connection, the junction of said resistors being selectively connected to ground.

5. Apparatus as claimed in claim 3, wherein said resistor coupling comprises a variable resistor.

6. Apparatus for dubbing signals recorded on one track of the tape of a magnetic recorder and external signals onto a second track of the same tape, comprising: a reproducing head scanning one track of a magnetic tape, a recording head for recording signals on a second track of the same magnetic tape, first and second signal coils associated with said reproducing and recording heads respectively, a first capacitor connected in parallel with said first signal coil, first amplifier means for amplifying the signals from said first coil, second amplifier means for amplifying the signals applied to said second signal coil, said second amplifier means comprising a plurality of stages one of which includes a triode having a tuned filter in its cathode circuit, a resistor coupling between the output of said first amplifier means and the cathode of said triode of the second amplifier means, and means for applying external signals to the grid of said triode, said parallel connection in combination with said tuned filter acting to suppress feedback from said reproducing head.

References Cited by the Examiner

UNITED STATES PATENTS

| | | | |
|---|---|---|---|
| 2,213,246 | 9/1940 | Heller | 179—100.2 |
| 2,733,301 | 1/1956 | Bradbury | 179—100.2 |

OTHER REFERENCES

Pages 5–6, 18–20, and 44, June 1960—Tandberg Radio, Tandberg Tape-Recorder Service Manual (model 6), Tandbergs Radiofabrikk A/S, Oslo, Norway.

Pages 144–146, 1957—Burstein and Pollak, Elements of Tape Records Circuits, Gernsback Library Inc., New York 11, N.Y.

IRVING L. SRAGOW, *Primary Examiner.*

BERNARD KONICK, *Examiner.*